United States Patent [19]

Majima

[11] Patent Number: 4,731,091

[45] Date of Patent: Mar. 15, 1988

[54] THERMAL TRANSFER PRINTING METHOD AND PRINTING PAPER WITH CELLULOSE FIBER BASE CONTAINING RESIN FIBERS OR RESIN COATING

[75] Inventor: Osamu Majima, Tokyo, Japan

[73] Assignee: Sony Corporation, Tokyo, Japan

[21] Appl. No.: 684,284

[22] Filed: Dec. 20, 1984

Related U.S. Application Data

[62] Division of Ser. No. 400,424, Jul. 21, 1982, Pat. No. 4,505,975.

[30] Foreign Application Priority Data

Jul. 25, 1981 [JP] Japan .......................... 56-109806[U]
Jul. 27, 1982 [JP] Japan .......................... 57-29831[U]

[51] Int. Cl.[4] .......................... D06P 1/52; B41M 5/26; D21H 3/36; B32B 29/06

[52] U.S. Cl. .......................... 8/471; 8/512; 8/519; 8/919; 428/195; 428/256; 428/336; 428/206; 346/135.1

[58] Field of Search .......................... 8/471

[56] References Cited

U.S. PATENT DOCUMENTS

| | | | |
|---|---|---|---|
| 4,119,398 | 10/1978 | Purser | 8/467 |
| 4,132,833 | 1/1979 | Sandhu | 428/481 |
| 4,207,069 | 6/1980 | Ono | 8/471 |
| 4,273,552 | 6/1981 | Nischwitz | 8/471 |
| 4,284,410 | 8/1981 | Nischwitz et al. | 8/471 |
| 4,294,641 | 10/1981 | Reed et al. | 156/234 |
| 4,496,955 | 1/1985 | Maeyama et al. | 346/76 |
| 4,505,975 | 3/1985 | Majima | 8/470 |
| 4,522,881 | 6/1985 | Kobayashi et al. | 8/471 |
| 4,576,610 | 3/1986 | Donenfeld | 8/471 |

FOREIGN PATENT DOCUMENTS

| | | |
|---|---|---|
| 36639 | 9/1981 | European Pat. Off. . |
| 2642350 | 3/1978 | Fed. Rep. of Germany . |
| 2407826 | 7/1979 | France . |
| 1558403 | 1/1980 | United Kingdom . |
| 2049554 | 12/1980 | United Kingdom . |
| 2147614 | 5/1985 | United Kingdom . |

*Primary Examiner*—A. Lionel Clingman
*Attorney, Agent, or Firm*—Lewis H. Eslinger; Alvin Sinderbrand

[57] ABSTRACT

In a thermal transfer-type printing method in which an image is formed on printing paper by the selective transfer thereto of disperse dye from a dye carrier of flexible sheet material in response to the selective application of thermal energy to the carrier while in contact with a surface of the printing paper, the latter is comprised of a base of cellulose fibers and resin into which the disperse dye diffuses for producing a clear definition of the image. The resin is desirably polyester or acetyl cellulose either in the form of fibers which are co-mingled with the cellulose fibers in the base of the printing paper, or in the form of a coating on a surface of the paper base. After the image has been formed by thermal transfer on a surface of the printing paper, a thin transparent film, preferably of polyester, is laminated over the printed surface by a polyester adhesive and the application of heat and pressure so that recrystallized disperse dye remaining on the surface of the printing paper is further diffused into the polyester adhesive.

26 Claims, 4 Drawing Figures

THERMAL TRANSFER PRINTING METHOD AND PRINTING PAPER WITH CELLULOSE FIBER BASE CONTAINING RESIN FIBERS OR RESIN COATING

This is a division of application Ser. No. 400,424, filed July 21, 1982, now U.S. Pat. No. 4,505,975 which issued Mar. 19, 1985.

BACKGROUND OF THE INVENTION

1. Field of the Invention

This invention relates generally to thermal transfer printing, and more particularly is directed to an improved method for forming an image on a printing paper by the selective transfer thereto of disperse dye from a dye carrier in response to the selective application of thermal energy to the carrier while in contact with the printing paper, and also to an improved printing paper for receiving the disperse dye.

2. Description of the Prior Art

As a rule, thermal transfer printing employs a printing paper formed of cellulose fibers to which a disperse dye is selectively transferred from a dye carrier in the form of an ink ribbon or web. It is well known that disperse dye efficiently colors the printing paper when the dye is in a mono-molecular state as a result of the diffusing of the disperse dye between molecules of the printing paper. However, the distance between cellulose molecules is smaller than the dimensions of the disperse dye molecules so that it is very difficult for the disperse dye to diffuse into the usual printing paper formed of cellulose fibers. Accordingly, some of the disperse dye transferred from the carrier to the printing paper remains in a crystalline state on the surfaces of the cellulose fibers forming the printing paper, and thus cannot be in the mono-molecular state necessary for clearly generating the respective color as is required for producing a clear color image. Further, if the surface of the printing paper to which the disperse dye is selectively transferred from a dye carrier is non-porous and very smooth, the ink ribbon or web constituting the dye carrier and the printing paper frequently stick to each other.

OBJECTS AND SUMMARY OF THE INVENTION

Accordingly, it is an object of the present invention to provide an improved thermal transfer printing method and a printing paper for use therein which serve to avoid the above-mentioned disadvantages of the prior art.

More specifically, it is an object of this invention to provide a thermal transfer type image printing method and a printing paper therefor by which there is achieved improved diffusion into the printing paper of a disperse dye selectively transferred from a dye carrier in response to the selective application of thermal energy to the carrier while in contact with the printing paper.

Another object is to provide a thermal transfer printing method and a printing paper therefor, as aforesaid, and by which a colored image of increased clarity can be obtained.

A further object of the present invention is to prevent undesirable random reflections of light from the surface of the printing paper on which an image has been formed, whereby to increase the contrast of such image.

In accordance with an aspect of this invention, the printing paper on which an image is to be formed by the selective transfer thereto of disperse dye from a dye carrier of flexible sheet material in response to the selective application of thermal energy to the carrier while in contact with the printing paper, is comprised of a base of cellulose fibers and resin into which the disperse dye can diffuse for producing a clear definition of the image. Such resin is desirably polyester or acetyl cellulose (cellulose acetate) either in the form of fibers co-mingled with the cellulose fibers in the base of the printing paper, or in the form of a coating on the surface of such base.

It is also a feature of this invention to include a filling material either in the base of the printing paper along with the co-mingled resin and cellulose fibers, or in the resin coating for improving the whiteness of the printing paper and also imparting roughness to its surface so that the dye carrier and the printing paper will not stick to each other at the time of the thermal transfer of the disperse dye therebetween.

In accordance with another feature of this invention, after an image has been formed on a surface of the printing paper by the thermal transfer of disperse dye thereto, a thin transparent film, preferably of polyester, is laminated onto such surface of the printing paper by means of a polyester adhesive and the application of heat and pressure so that any recrystallized disperse dye remaining on the surface of the printing paper is thereby also diffused into the polyester adhesive for further enhancing the clarity of the printed image.

In accordance with still another feature of this invention, the heat and pressure for laminating the thin transparent film to the printed surface of the printing paper are applied by passing the transparent film and printing paper jointly between a heated roller and a back-up or pressure roller, whereby the surface of the transparent film is smoothed or calendered so as to avoid undesirable random reflections of light therefrom with the result that the contrast of the printed image viewed through the transparent film is increased.

The above, and other objects, features and advantages of the invention, will be apparent in the following detailed description of illustrative embodiments thereof which is to be read in connection with the accompanying drawings forming a part hereof, and in which the same parts are identified by the same reference numerals in the several views of the drawings.

DESCRIPTION OF THE PREFERRED EMBODIMENTS

Figure 1:
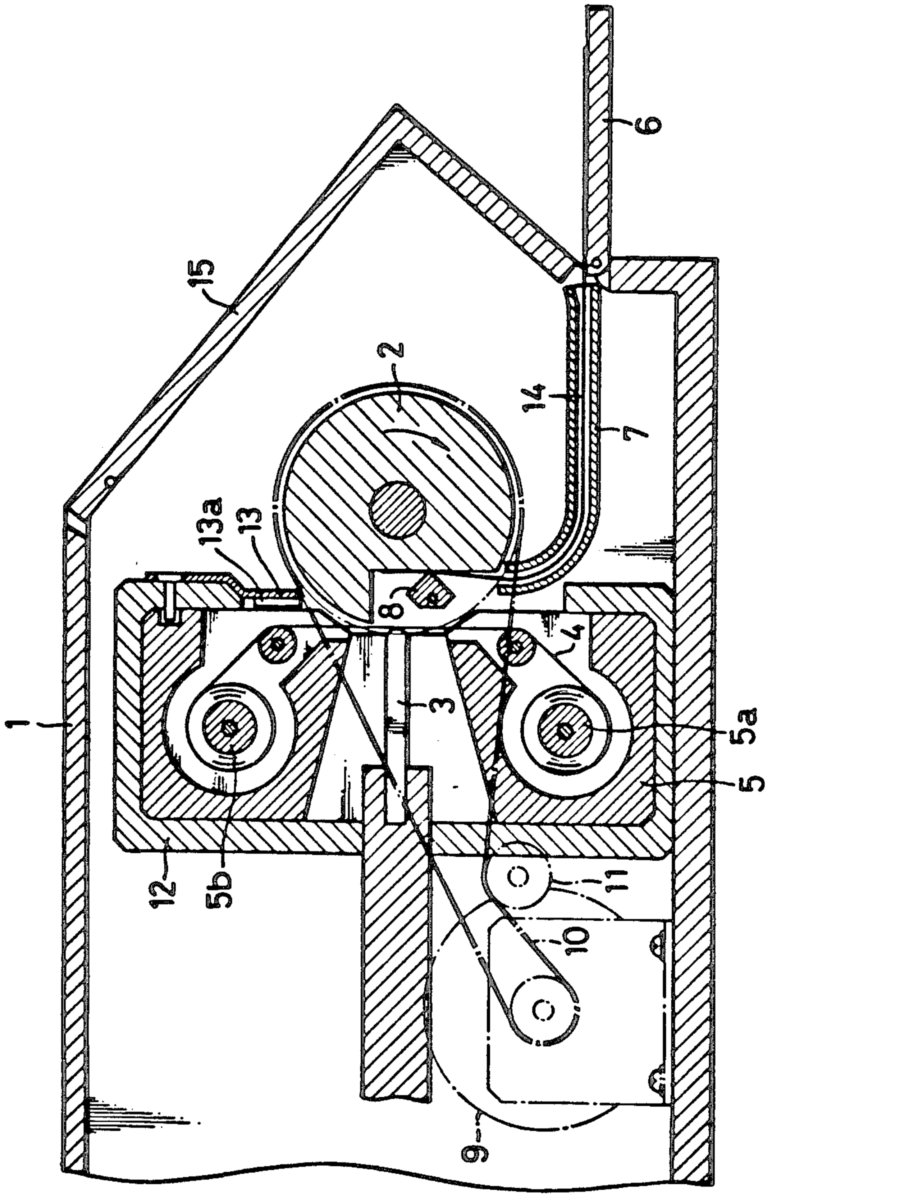
FIG. 1 is a vertical sectional view through one example of a thermal transfer-type image printer which may be employed in the thermal transfer of an image to the surface of printing paper according to an embodiment of the present invention.

Referring in detail to FIG. 1, it will be seen that a printer of a type that may be used for forming an image on printing paper in accordance with an embodiment of this invention by the selective transfer to the paper of disperse dye from a dye carrier in response to selective application of thermal energy to the carrier while in contact with the printing paper generally comprises, within a housing 1 provided with an access door or cover 15, a rotatable platen 2, a thermal printing head 3 fixedly disposed at a printing region adjacent the circumferential surface of platen 2, and a dye carrier in the form of a ribbon or web 4 coated with disperse dye or ink and located in a cassette 5. A feed tray 6 on housing 1 leads to a paper guide 7 in the housing extending to adjacent the periphery of platen 2 and through which a sheet or printing paper 14 may be fed by suitable sheet feeding means (not shown). Platen 2 is shown to be provided with a notch or cut-out portion extending along its length and having a paper clamp 8 located therein. When a sheet of printing paper 14 is fed along guide 7 to platen 2, the leading edge portion of the paper sheet is secured in the notch or cut-out portion of platen 2 by clamp 8 and, as platen 2 is rotated in the direction of the arrow on FIG. 1, the sheet of printing paper 14 is wrapped about the peripheral surface or circumference of platen 2 for movement with the latter. For intermittently driving platen 2 there is provided an electric motor 9 which is connected with the platen by way of a belt and pulley transmission 10 tensioned by means of an idler pulley 11.

The cassette 5 is shown on FIG. 1 to be located within a cassette holder 12 and to include a supply reel 5*a* and a take-up reel 5*b* on which the ribbon or web 4 coated with disperse dye or ink is wound so that a run of web 4 extending between reels 5*a* and 5*b* is interposed between platen 2 and thermal printing head 3 at the printing region. The reels 5*a* and 5*b* in cassette 5 are suitably driven so that the run of ribbon or web 4 therebetween is moved past head 3 in synchronism with the movement of the printing paper 14 on platen 2 as the latter is intermittently driven by motor 9.

Figure 2:
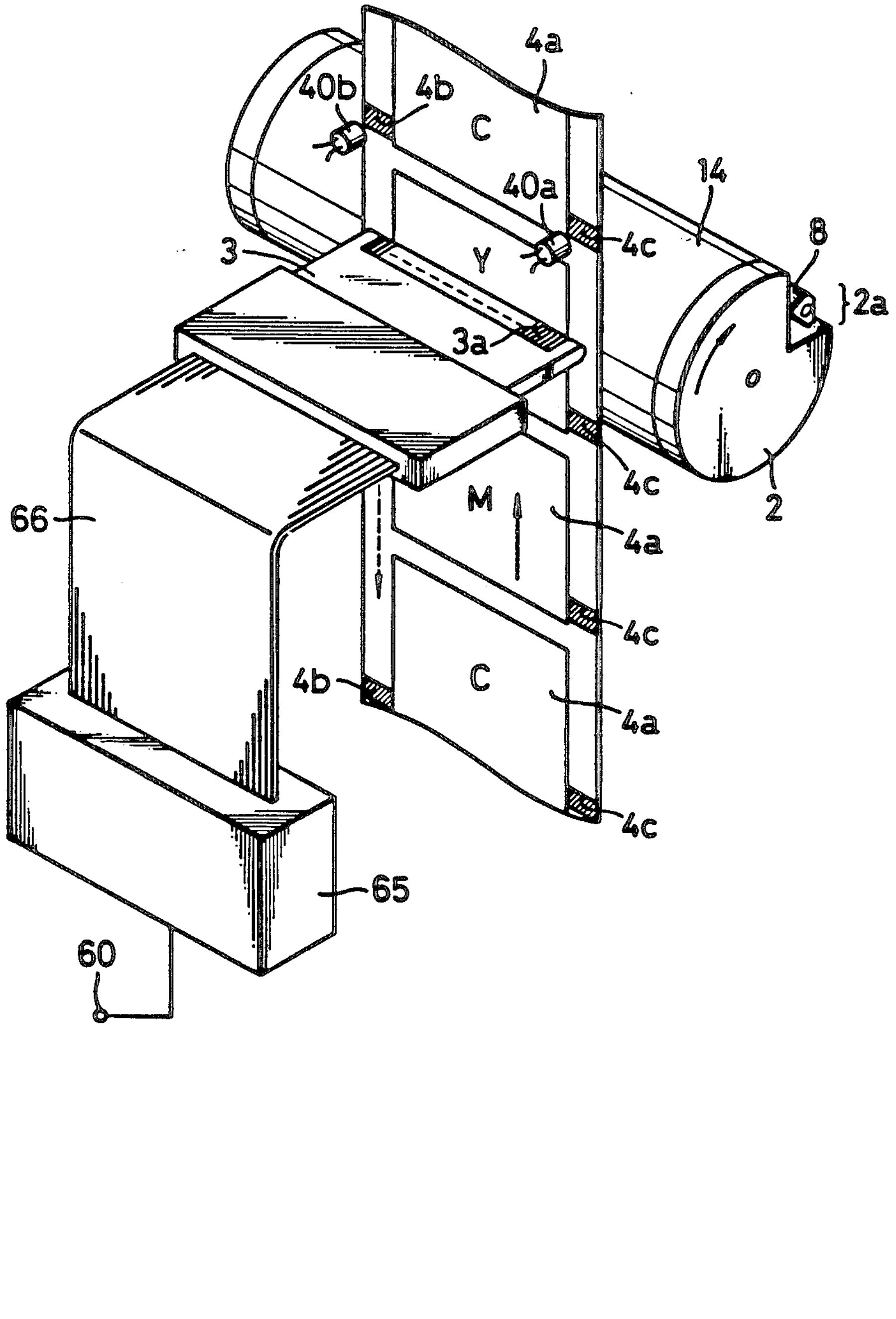
FIG. 2 is a schematic perspective view illustrating the relationships of essential components of the image printer of FIG. 1.

As shown particularly on FIG. 2, the printing head 3 is laterally elongated to extend across the effective width of web 4, and is comprised of a succession of discrete thermal or heating elements 3*a* which are selectively energized during the intervals between intermittent movements of web 4 and platen 2 so as to effect the thermal transfer to printing paper 14 on the platen of disperse dye from incremental areas of web 4 then engaged by the respective heating elements 3*a*. By way of example, thermal printing head 3 may have 256 heating elements 3*a* arranged in a horizontal row, and each corresponding to a respective picture element of a copied image. The selective energizing of heating elements 3*a* may be achieved with reference to a still video signal which, for example, is reproduced from a magnetic tape or disc (not shown). In such case, the reproduced video signal is applied through an input terminal 60 to a signal processing circuit 65 which selectively energized heating elements 3*a* through respective conductors in a flat connecting cable 66 extending to head 3. In the case where the input terminal 60 receives color video signals which include the usual luminance and chrominance components, signal processing circuit 65 may be of a type known to those of ordinary skill in the prior art for producing complementary color signals derived from such components. For example, signal processing circuit 65 may produce yellow, magenta and cyan video signals by subtracting blue, green and red color signals, respectively, of the chrominance component from the luminance component. These complementary color video signals, that is, the yellow, magenta and cyan video signals are produced in sequence by processing circuit 65 to provide respective energizing signals for elements 3*a* of thermal printing head 3.

As shown particularly on FIG. 2, in the case where circuit 65 processes color video signals as described above, the dye carrier or web 4 is comprised of repeated sequences of frames 4*a* of yellow, magenta and cyan colored thermally transferrable disperse dyes, as indicated at Y, M and C, respectively. Further, index marks 4*b* are spaced apart along one longitudinal edge of web 4 to indicate the beginning of each sequence of the differently colored frames of thermally transferrable disperse dyes. For example, as shown, each index mark 4*b* may be disposed adjacent the lower boundary of each frame C containing the cyan colored disperse dye. Index marks 4*c* are also spaced apart along the opposite longitudinal edge of web 4 for indicating the boundaries between the successive frames of each sequence thereof, for example, the boundary between the yellow and magenta colored frames Y and M, the boundary between the magenta and cyan colored frames M and C, and the boundary between the cyan and yellow colored frames C and Y.

Index marks 4*b* and 4*c* may be optically detectable by photo-detectors 40*b* and 40*a*, respectively, fixedly mounted, for example, on end portions 13*a* (FIG. 1) of a mounting assembly 13 affixed to cassette holder 12. Of course, the optically detectable index marks 4*b* and 4*c* may be replaced by similarly located magnetic or electrically conductive indicia or strips which are detectable by magnetic or conductive pick-up devices, respectively. It will be appreciated that such index marks 4*b* and 4*c* and the resulting index signals from the detectors 40*b* and 40*a* respectively, are used to control the motor 9 for driving platen 2 and the motor or other drive means (not shown) for driving web 4 past the printing region at which head 3 is located.

In operation of the above-described thermal transfer printer, a sheet of printing paper 14 is fed from tray 6 through guide 7 to the notch or cut-out of platen 2 to be secured or clamped therein by paper clamp 8 while platen 2 is in its initial position illustrated on FIG. 1. Then, a printing operation is initiated, for example, by the actuation of a suitable START switch (not shown), so that motor 9 is energized to commence the intermittent turning of platen 2 from its initial position. In the course of such intermittent turning of platen 2 in the direction indicated by the arrow on FIG. 1, successive, contiguous laterally elongated areas of paper 14 are brought to rest at the print region opposite thermal printing head 3 with web 4 being pinched between elements 3*a* of head 3 and the laterally elongated incremental area of paper 14 then in the printing region. During the first revolution of platen 2 from its initial position, reels 5*a* and 5*b* of cassette 5 are synchronously driven to simultaneously move web 4 intermittently upward starting from an initial position in which the upper boundary of a yellow-colored frame C of web 4 is disposed at the printing region proximate to head 3. During the first revolution of platen 2 and the corresponding movement of a yellow colored frame C of web 4 past the printing region proximate to head 3, yellow color signals are produced by processing circuit 65 from a still color television or video signal applied to terminal 60. The still color television or video signal is sampled at successive points along each horizontal line to produce a group of picture element signals, for example, 256 picture element signals, which correspond to the yellow intensities in the still television image or picture at the points where a vertically arranged sampling line crosses the 256 lines of a field. In such case, 256 yellow picture element signals, comprising a group thereof, are supplied in parallel to the respective heating elements 3*a* which thereby effect corresponding thermal transfers of yellow colored disperse dye from respective incremental areas of the yellow colored frame Y of web 4 to respective locations on printing paper 14. As platen 2 is intermittently turned through its first complete rotation and web 4 moves upward in synchronism therewith, yellow colored disperse dye is transferred by head 3 from vertically successive, laterally extending incremental areas of frame Y to corresponding areas on printing paper 14 so that, upon the return of platen 2 to its initial position, a complete yellow image has been deposited on printing paper 14. During the next revolution of platen 2, a magenta colored frame M of web 4 is intermittently moved upwardly past head 3 in synchronism with the intermittent turning of platen 2, and processing circuit 65 supplies magenta color signals to heating elements 3*a*. Thus, upon completion of the second revolution of platen 2, a magenta-colored image will have been transferred to printing paper 14 in accurate registration with the previously transferred yellow-colored image. Finally, during the third revolution of platen 2, a cyan colored frame C of web 4 is moved intermittently upward past head 3 in synchronism with the turning of platen 2, while processing circuit 65 provides cyan color signals to heating elements 3*a*. Thus, at the completion of the third revolution of platen 2, a cyan colored image is superposed on the previously applied yellow and magenta images so as to provide a reproduced still composite color television picture on the sheet of printing paper 14.

In the above-described thermal printer which is desirable for use in connection with the present invention and which is described in greater detail in U.S. patent application Ser. No. 384,284, filed June 2, 1982, and having a common assignee herewith, thermal elements 3*a* are aligned in a linear array having a length equal to the eventually vertical height of the composite color image or picture to be printed on paper 14. In such case, web 4 exhibits a width dimension, as viewed in FIG. 2, which is at least equal to the length dimension of printing head 3. Thus, a strip, or vertical column of incremental images is printed on paper 14 each time thermal printing elements 3*a* are selectively energized in a single or simultaneous energizing operation. Thus, the number of such energizing operations required for completing the transfer of each color frame to paper 14 corresponds only to the number of locations along each horizontal line of the video signal at which the latter is to be sampled. Characteristically, each horizontal line may be sampled at 1024 locations therealong, so that, in that case, there will be 1024 energizing operations during each revolution of platen 2. Furthermore, although printing head 3 has been described as having 256 heating elements 3*a* arranged thereacross in correspondence with the like number of horizontal lines in a field of a television signal according to the NTSC system, the printing head 3 may alternatively be provided with 512 heating elements in correspondence with the number of lines in a frame of the video signal according to that system.

Further, a thermal transfer printer for use with the method and printing paper according to the present invention may employ a printing head comprised of a single heating element which is made to scan a raster across each color frame 4*a* of web 4 as printing paper 14 moves past the printing region. In other words, the single heating element may be laterally reciprocated to scan across the width of each frame 4*a* of web 4 as the latter is intermittently moved upwardly through the printing region and as the energizing of the single heating element is varied in correspondence with the amount of disperse dye to be transferred at each elemental area of the image. However, a single heating element which is made to scan across the web inherently results in a relatively "slow" printing process and, therefore, it is preferred to use a thermal transfer printer of the type described above with reference to FIGS. 1 and 2.

In accordance with the present invention, the printing paper 14 to which disperse dye is thermally transferred, as described above, comprises a base of cellulose fibers and a resin which is preferably thermo-setting or thermo-plastic, such as, polyester or acetyl cellulose, and into which the transferred disperse dye can diffuse for producing a clear definition of the resulting image.

Figure 3:
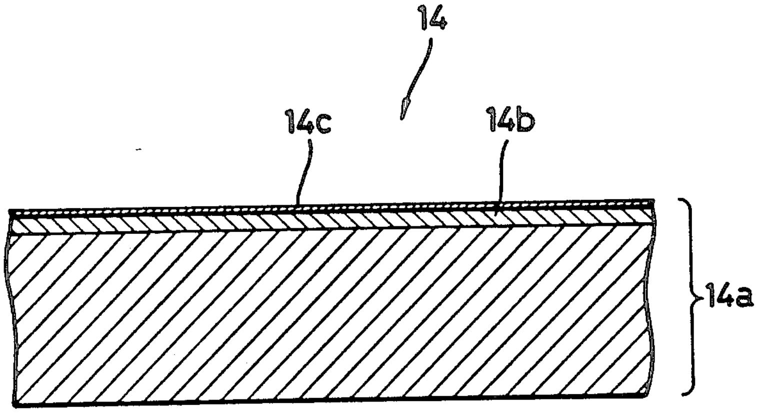
FIG. 3 is an enlarged sectional view through a fragment of a sheet of printing paper according to one embodiment of the present invention.

The resin into which the transferred disperse dye can diffuse may be applied as a coating on a surface of a paper base 14*a* of cellulose fibers, as shown on FIG. 3. More particularly, the resin in the form of a saturated polyester solution or a non-saturated polyester emulsion may be painted on a surface of a conventional printing paper of cellulose fibers so that the resulting printing paper 14 according to this invention will have a layer or coating 14*c* of polyester defining a surface of the paper to be printed and, below that, a layer or strata 14*b* of the cellulose base 14*a* in which the polyester is absorbed.

EXAMPLE 1

A saturated polyester solution suitable for coating a conventional cellulose-type printing paper as aforesaid, consists essentially of:

15 weight percent of thermo-plastic polyester
50 weight percent of ethyl acetate
35 weight percent acetone.

The above saturated polyester solution is painted on a conventional cellulose type printing paper of 100 microns thickness at the rate of 30 grams of the solution for each square meter of paper surface. After the conventional cellulose type printing paper is coated with the saturated polyester solution, the absorbed layer indicated at 14*b* on FIG. 3 has a depth of 25 to 50 microns, and the surface layer of polyester indicated at 14*c* has a thickness of 5 microns.

A polyester used in accordance with this invention for coating the printing paper may be a mixture of 30 weight percent of styrene and the balance comprised of a co-polymer of phthalic anhydride and propylene glycol. Further, if desired, the polyester may be replaced by acetyl cellulose.

EXAMPLE 2

A non-saturated emulsion that may be used for coating the printing paper according to this invention consists essentially of:

20 weight percent of a mixture of styrene monymer and chain-bonded alkyd resin 0.5 weight percent of a mixture of benzyl peroxide and dimethyl aniline 1.0 weight percent of polyoxy ethylene sorbitanecholesteric acid, and 78.5 weight percent water The above non-saturated emulsion may be painted on the conventional cellulose printing paper which is thereafter subjected to heating.

In the case of a printing paper coated with polyester as described above or similarly with acetyl cellulose, the absorbed polyester or acetyl cellulose wraps or envelops the cellulose fibers of the paper base so that the heat transferred disperse dye, for example, Disperse Red 11, which is an anthraquinone based disperse dye, diffuses into the polyester or acetyl cellulose, rather than seeking to diffuse between the cellulose molecules. Since the molecular distances in the polyester or acetyl cellulose are large enough to permit the diffusion therein of the molecules of the disperse dye, the color of the reproduced image is obtained with improved clarity.

As an alternative to the above-described embodiments of the invention in which the conventional cellulose type printing paper is coated on its surface with the polyester or acetyl cellulose, printing paper according to the invention may be formed of polyester or acetyl cellulose fibers which are co-mingled with the cellulose fibers when producing the paper itself. More specifically, in printing papers of this type according to the present invention, 50 to 70 weight percent of polyester or acetyl cellulose fibers are mixed with cellulose fibers when producing the printing paper. When using such printing papers for the thermal transfer of disperse dye thereto, the transferred dye is well diffused into the polyester or acetyl cellulose fibers co-mingled with the cellulose fibers so that a clear color image is reproduced.

Preferably, filling material, such as titanium oxide or calcium carbonate, are included in printing papers according to this invention for improving the whiteness thereof, and also for increasing the roughness of the surface of the printing paper by which the sticking together of the disperse dye carrying web 4 and the printing paper can be avoided. More specifically, in the case of a printing paper according to this invention having a polyester coating applied in the form of a solution thereof, as in Example 1 above, the filling material of titanium oxide or calcium carbonate may be added to such coating in an amount constituting approximately 30 to 60 weight percent of the polyester solution. In the case where the printing paper according to this invention is constituted by a mixture of cellulose fibers and polyester or acetyl cellulose fibers, the mentioned filling material may be included therein in an amount constituting approximately 10 to 30 weight percent of the mixture of cellulose fibers and polyester or acetyl cellulose fibers.

Figure 4:
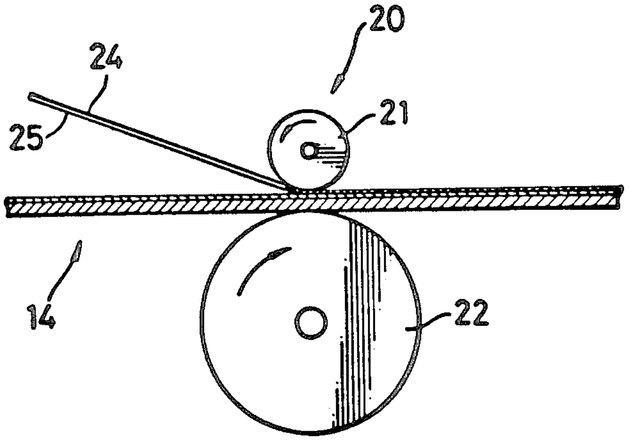
FIG. 4 is a sectional view illustrating the lamination of a thin transparent film to the printing paper after the transfer of an image to the letter in accordance with a method embodying this invention.

Referring now to FIG. 4, it will be seen that, after an image has been printed by thermal transfer on printing paper 14 according to this invention, a thin transparent film 24, preferably of polyester such as polyethylene terephthalate having a thickness of approximately 15 to 30 microns, is laminated on the printed surface of paper 14. Preferably, the lamination of film 24 on paper 14 is effected by means of a polyester adhesive, which may be the polyester solution specified above in Example 1, and which is applied as a coating to the surface of film 24 confronting the printed surface of paper 14. In order to effect the lamination, the printed paper 14 and film 24 with the polyester adhesive coating 25 thereon are passed together through a roller assembly having a heating roller 21 and a pressure or back-up roller 22. Preferably, the temperature of heating roller 21 is higher than the glass transition point of the polyester resin included in adhesive coating 25, for example, higher than about 70° centigrade. By reason of the heat and pressure applied by roller assembly 20, recrystallized disperse dye remaining on the surface of printing paper 14 at the completion of the thermal transfer of the image is diffused into polyester adhesive coating 25 and into polyester film 24. The heat and pressure of the lamination process also causes further diffusing of the disperse dye into the resin coating 14c on the printing paper 14 or into the polyester or acetyl cellulose fibers mixed with the cellulose fibers of the paper base. It will be appreciated that such diffusion of the disperse dye into the polyester or other resin is promoted or enhanced by reason of the increase in the molecular distances of the polyester or other resin resulting from the application of heat thereto.

The application of heat and pressure by roller assembly 20 is further effective to smooth or flatten the thin transparent film 24 laminated to printing paper 14 and through which the image on the latter is viewed, so that undesirable random reflections at the surface of the printing paper are avoided.

A chelating agent, such as, ethylene diamine tetraacetic acid, may be included in polyester film 24, or in the polyester adhesive 25 in an amount of approximately 0.2 to 0.3 weight percent. Such chelating agent serves to control the hue of the printed image on paper 14 according to this invention.

Further, in order to avoid discoloring or fading of the printed image as a result of exposure to sunlight, an ultra-violet ray absorbing agent, such as phenylsalicylate, is preferably included in polyester film 24 in an amount of approximately 0.4 to 2.0 weight percent.

By way of summary, it will be appreciated that, in thermal transfer printing according to this invention, diffusion of disperse dye from a flexible guide carrier or web into the printing paper is promoted to ensure the attainment of a colored image of increased clarity. Further, the contrast of such image is enhanced by the avoidance of undesirable random reflections of light from the surface of the printing paper.

Having described illustrative embodiments of the invention with reference to the accompanying drawings, it is to be understood that the invention is not limited to those precise embodiments, and that various changes and modifications may be effected therein by one skilled in the are without departing from the scope or spirit of the invention as defined in the appended claims.

What is claimed is:

1. In the method of forming an image on printing paper by the transfer thereto of disperse dye from a dye carrier of flexible sheet material in response to the application of thermal energy to the carrier while in contact with a surface of the printing paper; the improvement of forming said paper having a base of cellulose fibers combined with a resin selected from the group consisting of polyester and acetyl cellulose, said resin having distances between molecules thereof greater than the dimensions of molecules of said disperse dye, such that said disperse dye diffuses into said resin for producing a clear definition of said image and including the further step at the time of forming said paper of adding to said cellulose fibers a filling material selected from the group consisting of titanium oxide and calcium carbonate for improving the whiteness of the coated paper and for imparting roughness to the surface thereof which is to receive the transferred disperse dye and further comprising the step of laminating a transparent film by means of a polyester adhesive formed of an aqueous solvent solution of a styrene monomer and chain-bonded alkyd resin onto said surface of the printing paper after the forming of said image thereon by transfer of said disperse dye from said dye carrier.

2. The method according to claim 1; in which said resin is a thermosetting resin.

3. The method according to claim 1; in which said resin is provided in the form of fibers and the step of forming said paper includes the step of comingling said resin fibers with said cellulose fibers in said base, with said resin fibers constituting approximately 50 to 70 weight percent of said base.

4. The method according to claim 3; in which said resin fibers are comprised of polyester.

5. The method according to claim 3; in which said resin fibers are comprised of acetyl cellulose.

6. The method according to claim 1; in which said resin is combined with said base of cellulose fibers by coating said resin on the surface of said paper which is to receive said disperse dye.

7. The method according to claim 1; in which said film is further made to adhere to said printing paper by the application of heat and pressure.

8. The method according to claim 7; in which said film is of polyester.

9. The method according to claim 7; in which said heat is of a temperature higher than the glass transition point of said polyester adhesive.

10. The method according to claim 7; in which said film is of polyethylane terephthalate and has a thickness of 15 to 30 microns.

11. The method according to claim 7; in which one of said film and said polyester adhesive contains a chelating agent.

12. The method according to claim 11; in which said chelating agent is ethylene-diamine-tetra-acetic acid mixed in said adhesive in an amount of approximately 0.2 to 0.3 weight percent.

13. The method according to claim 7; in which said film contains an ultraviolet ray absorbing agent.

14. The method according to claim 13; in which said film is polyester and said agent is 0.5 to 2.0 weight percent of phenylsalicylate.

15. The method according to claim 7; in which said heat and pressure are applied by passing said film and printing paper together between a heated roller and a pressure roller.

16. In the method of forming an image on printing paper by transfer thereto of disperse dye from a dye carrier of flexible sheet material in response to the application of thermal energy to the carrier while in contact with the printing paper, the improvement of: forming said printing paper having a base of cellulose fibers combined with a resin consisting of acetyl cellulose fibers comingled therewith, said resin having distances between molecules greater than the dimensions of molecules of said disperse dye, such that said disperse dye diffuses into said resin for producing a clear definition of said image; and laminating a transparent film onto said surface of the printing paper after forming said image thereon by transfer of said disperse dye from said dye carrier, said laminating including applying a polyester adhesive consisting of an aqueous solvent solution of styrene monomer and chain-bonded alkyd resin between said transparent film and said printing paper.

17. The method according to claim 16; in which said film is further made to adhere to said printing paper by applying heat and pressure.

18. The method according to claim 16; in which said transparent film is formed of polyester.

19. The method according to claim 17; in which said heat is of a temperature higher than the glass transition point of said polyester adhesive.

20. The method according to claim 16; in which said transparent film is formed of polyethylane terephthalate and has a thickness of 15 to 30 microns.

21. The method according to claim 16; in which one of said transparent film and said polyester adhesive contains a chelating agent.

22. The method according to claim 21; in which said chelating agent is ethylane-diamine-tetra-acetic acid mixed in said adhesive in an amount of approximately 0.2 to 0.3 weight percent.

23. The method according to claim 16; in which said transparent film contains an ultraviolet ray absorbing agent.

24. The method according to claim 23; in which said transparent film is polyester and said absorbing agent is 0.5 to 2.0 weight percent of phenylsalicylate.

25. The method according to claim 17; in which said heat and pressure are applied by passing said film and printing paper together between a heated roller and pressure roller.

26. The method according to claim 16; including the further step of adding to said cellulose fibers, a filling material selected from the group consisting of titanium oxide and calcium carbonate at the time of forming said paper, thereby improving the whiteness of the coated paper and for imparting roughness to said surface thereof which is to receive the transferred disperse dye.

* * * * *